April 15, 1958  M. W. MARIEN  2,830,861
OIL CONTROL RING
Filed March 23, 1956
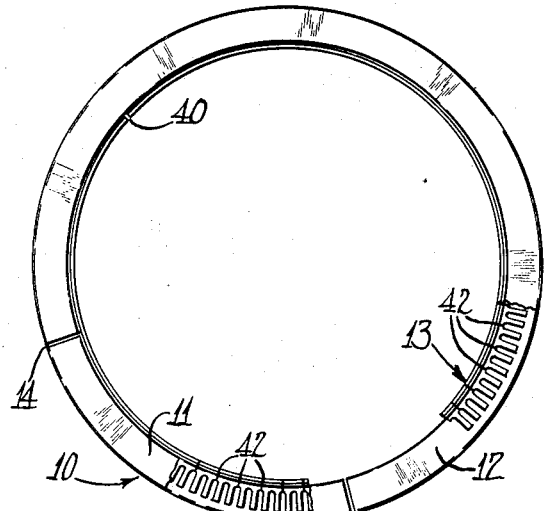
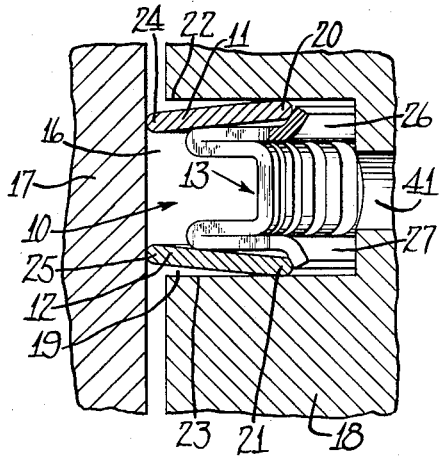
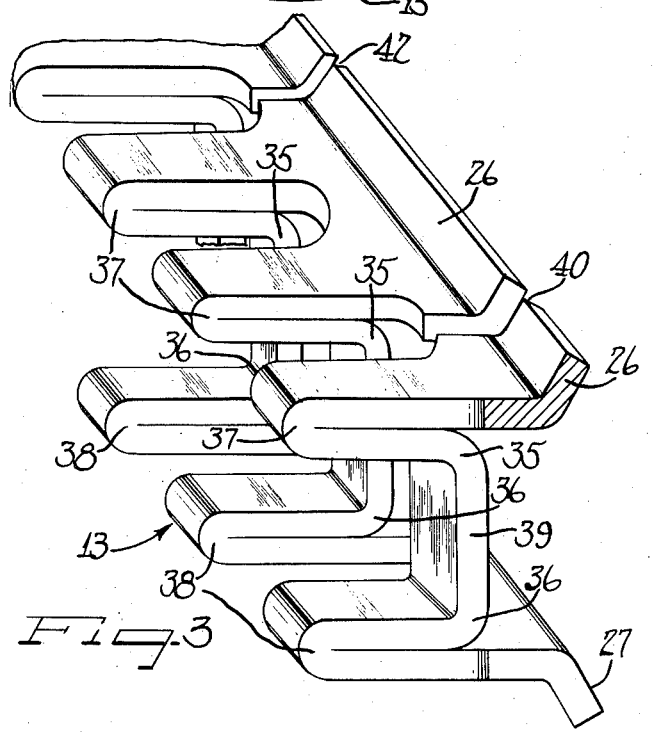
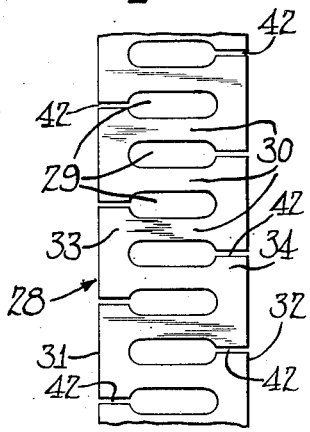
Inventor
Melvin W. Marien
Attys

United States Patent Office 2,830,861
Patented Apr. 15, 1958

2,830,861

OIL CONTROL RING

Melvin W. Marien, Brentwood, Mo., assignor to Ramsey Corporation, St. Louis, Mo., a corporation of Ohio Application March 23, 1956, Serial No. 573,496

6 Claims. (Cl. 309—45)

The present invention relates to an oil control ring, and more particularly relates to an oil control ring assembly of the type having a circumferential expander-spacer ring therein.

While there are numerous types of oil control rings and oil control ring assemblies for utilization in conjunction with piston and cylinder assemblies such as might be found in the internal combustion engine, the rings and ring assemblies serving to prevent oil from reaching the combustion chamber, the type of such oil control ring or oil control ring assemblies which has enjoyed extensive utilization in recent times is the type wherein thin split rail rings are disposed in the oil ring groove of the piston and held in position by a circumferential expander-spacer ring.

These circumferential expander-spacer rings also have had many forms and have been of many types but universally have been designed to have the common properties of spacing the thin split rail rings and backing up the same to expand the thin split rail rings into contact with the cylinder wall. While these properties are also common to the expander-spacer ring of the instant invention, it is an important object, feature and advantage of the present invention to provide a highly new and improved, more efficient, less expensive, and easier to manufacture expander-spacer ring.

One of the important problems that has faced utilization of many heretofore known types of circumferential expander-spacer rings lies in the notching or grooving and excessive wearing of the thin split rail rings along the inner peripheral edges thereof since many of the expander-spacer rings back-up the thin split rail rings with short tab like projections from the expander-spacer rings.

In accordance with the principles of the present invention, however, an expander-spacer ring may have practically continuous peripheral edges for backing up the thin split rail rings thereby adding greatly to the longevity of the thin split rail rings as well as to the expander-spacer ring itself.

Another difficulty which has existed in the utilization of this type of ring assembly has resided in the shaping, bending and forming of the expander ring per se since some thereof have 180° bends at the tab like formations resulting in a possible overstress and eventual failure of the expander-spacer ring.

In accordance with the principles of the present invention, however, an expander-spacer ring may be formed, bent and shaped with the sharp bends therein at points which are not critical stress points in the ring whereby the life of the expander-spacer ring is greatly increased.

Also, by shaping and configurating an expander-spacer ring in accordance with the principles of this invention, thinner and less expensive materials may be employed for the expander-spacer ring thereby providing a more economical, yet more efficient, expander-spacer ring and also thereby removing heretofore existing problems with regard to groove depth wherein the 180° bend occurred in the formation of a tab of double thickness, preventing its use in some grooves with previously established groove depths.

A difficulty which has existed with this general type of ring has been that the tabs tend to slip from behind the rails when under operating forces allowing parts of the circumferential expander to disengage the rails and wedge in between them. When this happens the ring assembly cannot function properly and oil control is lost. In accordance with the present invention, however, the form is such that the sides of the circumferential expander are supported by cross bars disposed in the axial direction making it impossible for the tabs to become disengaged from the rails.

Therefore, it is an important object, feature and advantage of this invention to provide an oil ring assembly with a new and improved expander-spacer ring.

Therefore, it is an important object, feature and advantage of this invention to provide an oil ring assembly with a new and improved expander-spacer ring having substantially continuous peripheral edges for almost continuous line contact with the inner peripheral edges of the thin split rail rings with which it is to be employed.

Still another object, feature and advantage of the present invention is to provide a new and improved expander-spacer ring so bent, shaped and configurated that the bends therein are in less critical positions on the expander-spacer ring thereby adding substantially to the life of the ring.

Still another object, feature and advantage of this invention is to provide a new and improved expander-spacer ring so formed as to effectively and more efficiently utilize thinner and less expensive material thereby providing a more economical and easier to manufacture ring. This also provides the advantages of avoiding problems regarding groove depth for the oil control ring groove in the piston in which the oil control ring assembly is disposed.

Numerous other objects, features and advantages of this invention will become more readily apparent from the following detailed description of the invention and an embodiment thereof, from the claims, and from the accompanying drawings in which each and every detail shown is fully and completely disclosed as a part of this specification, in which like reference numerals refer to like parts, and in which:

Figure 1 is a broken elevational view of an oil control ring assembly in accordance with this invention with parts thereof broken away to more clearly illustrate other parts thereof;

Figure 2 is a fragmental sectional view of a piston and cylinder illustrating the oil ring groove in the piston with an oil control ring assembly therein and embodying the principles of this invention;

Figure 3 is a fragmental isometric illustration of an expander-spacer ring in accordance with this invention; and Figure 4 is a fragmental illustration of a strip of material from which the expander-spacer ring of this invention is formed.

As described in detail hereinbelow, a circumferential expander spacer ring in accordance with this invention is formed from a strip of resilient material, such as spring steel, and at closely spaced points along the length thereof, apertures are provided therein which are relatively long and narrow and extend transversely of the strip intermediate the side edge portions thereof. These apertures then leave therebetween transversely extending legs which join the edge portions of the strip and are integral therewith. The strip is then bent into a more or less H-shaped configuration with the edge portions extending from the same end of the H and with 180° bends in the legs at the other end of the H. A pair of 90° bends in the legs provide for the cross bar in the ring. The ring is then rolled into annular form and the unbroken continuous edge portions are bent or flared axially outwardly of the ring to form backup or abutment portions to engage the inner peripheral edges of the thin rail rings with which it is to be employed.

By preference, the bent edge portions of the expander-spacer ring are flared to an acute angle to the axis of the ring thereby to dish and exert dishing forces as well as expanding forces on the thin rail rings to provide a more effective and more efficient seal of the thin rail rings, the cylinder and the piston.

The expander-spacer ring of this invention is illustrated in a complete oil control ring assembly 10 in Figures 1 and 2. There it is shown that the ring assembly has a pair of thin split expandable rail rings 11 and 12 which are spaced apart, coaxially, and backed up for radial expansion by an expander-spacer ring 13. These thin split rail rings are formed of any desired material operable for the purpose and are commonly steel rings either having a high chromium content or being chromium plated or having chromium outer peripheral edges for long life and good wear characteristics.

These thin split rail rings have gaps or splits 14 and 15 respectively therein, permitting circumferential expansion thereof to maintain good contact with the cylinder wall such as the wall 16 of a cylinder 17 reciprocably receiving a piston 18 grooved as at 19 for the oil control ring assembly. The splits or gaps 14 and 15 in the thin rail rings 11 and 12 are preferably offset from each other thereby providing a more effective seal between the combustion chamber and the lubrication chamber, respectively, above and below the piston.

As may be seen in Figure 2, the expander-spacer ring so supports, biases and spaces the thin split rail rings 11 and 12 as to aid in dishing the rail rings outwardly along the inner peripheral edges thereof to provide good sealing contact between the inner edge regions 20 and 21 of the rings 11 and 12, respectively, and the radial faces 22 and 23, respectively, of the oil ring groove 19. The expander-spacer ring 13 also biases the thin split rail rings 11 and 12 radially outwardly and expands the same to insure good contact between the outer edges 24 and 25 thereof and the inner face 16 of the cylinder 17.

For this purpose, the expander-spacer ring is formed with edge portions 26 and 27 which engage the inner peripheral edges of the expander-spacer rings 11 and 12 at such an angle thereto as to bias the rail rings both axially and outwardly and radially outwardly thereby effecting both expansion of the rail rings and dishing thereof.

The details of the expander-spacer ring 13 as shown more fully in the isometric illustration of Figure 3 and the blank form illustration of Figure 4.

In the blank form illustration of Figure 4 it is illustrated that the expander-spacer ring 13 is formed from an elongated parallel edged strip 28 of resilient oil resistant material such as spring steel or other similar property material. The strip is then punched to provide a plurality of equally spaced transversely extending elongated apertures 29—29 therein leaving transverse legs 30—30 therebetween. The apertures 29—29 terminate at equal distances from the side edges 31 and 32 of the strip 28. At the edges of the strip are additional cuts or slits 42 which, along either edge, connect with every other opening. The cuts along one edge are staggered in relation to the cuts along the other edge.

The staggered cuts on either edge provide circumferential extensibility and contractability in the completely formed expander-spacer. When assembled in a groove with the rails 11 and 12 the ends of the expander are abutted. In this position the assembly is larger than cylinder diameter and must be compressed radially so that it can enter the cylinder. When in the operating position the circumferential expander-spacer then exerts equally distributed radial forces against the rails.

Following the punching operation the strip is rolled or bent into a more or less H-shaped configuration by bending the legs with a pair of bends of approximately 90° as at 35 and 36 in Figure 3 and with a pair of bends of approximately 180° as at 37 and 38 in Figure 3, so that the unbroken edge portions extend from the same end of the now H-shaped strip and so that the 180° bent portions extend toward the same end, the end opposite to the end from which the unbroken edge portions extend, of the H-shaped strip.

Thus formed, the expander-spacer ring has a symmetrical configuration and is so dimensioned that the cross bar portion 39 of the H-shaped ring is coordinated with the thickness of the material from which the ring is formed to hold the rail rings properly spaced apart in the oil ring groove of the piston. The length of the long legs is also such as to properly support the thin rail rings.

Further, by providing this configuration to the ring, the 180° bend portions 37 and 38 are not subjected to stresses that would serve to break the rings at those points while in operation and the ring is thereby relatively stronger and of increased life even though the ring may be formed of a thinner material than has heretofore been used for expander-spacer rings.

As a final operation in forming the ring, the ring is rolled into annular form, cut to a proper length to form a full circle ring with a gap 40 therein (Figures 1 and 3) and the edge portions are bent to form outwardly flared rail ring backing members 26 and 27. The angle of the bend or flare of these backing portions is, by preference, selected as an acute angle to the axis of the ring as pointed out hereinabove for the purposes stated hereinabove. Thus, in accordance with this invention the expander-spacer ring has almost continuous line contact abutment with the inner peripheral edges of the thin rail rings thereby avoiding any grooving or notching of the thin rail rings. Also, the ring may be formed of thinner material thus avoiding many problems regarding oil control ring groove depth for the groove 19 in the piston 18.

Further, by providing a great plurality of apertures in the ring, there is provided an easy flow path for any oil that might otherwise have been trapped in the ring to flow through the expander-spacer ring to an oil return aperture 41 in the piston leading from the back axial face of the oil ring groove 19 to means providing a flow path for the oil back to the oil system and lubricating system for the engine.

From the foregoing it will be readily understood that numerous variations and modifications may be effected without departing from the true spirit and scope of the novel concepts and principles of this invention. I, therefore, intend to cover all such modifications and variations as may fall within the true spirit and scope of the novel concepts and principles of this invention.

I claim as my invention:

1. In an oil seal ring assembly for cooperative arrangement in an oil ring groove in a piston to be reciprocably arranged with a cylinder, a pair of rail rings to have the outer circumferential edges thereof engage the cylinder in oil sealing contact therewith, and an expander-spacer ring bent radially inwardly to form spaced first portions disposed between said rail rings to axially space the same, and having other portions thereof formed to engage inner circumferential edges of the rail rings to radially expand the same and insure good sealing contact between the outer circumferential edges of the rail rings and the cylinder, said other portions of said expander-spacer ring being substantially continuous and said first portion having circumferentially spaced legs with apertures in said other portions between said legs.

2. In an oil seal ring assembly for cooperative arrangement in an oil ring groove in a piston to be reciprocably arranged with a cylinder, a pair of rail rings to have the outer circumferential edges thereof engage the cylinder in oil sealing contact therewith, and an expander-spacer ring bent upon itself radially inwardly to form first portions disposed between said rail rings to axially space the same, and having other portions thereof formed to engage inner circumferential edges of the rail rings to radially expand the same and insure good sealing contact between the outer circumeferntial edges of the rail rings and the cylinder, said other portions of said expander-spacer ring being substantially continuous and bent to extend relatively axially outwardly, respectively, of the ring, said first portions having circumferentially spaced legs with apertures in said other portions between said legs.

3. In an oil seal ring assembly for cooperative arrangement in an oil ring groove in a piston to be reciprocably arranged with a cylinder, a pair of rail rings to have the outer circumferential edges thereof engage the cylinder in oil sealing contact therewith, and an expander-spacer ring bent upon itself to form first portions disposed between said rail rings to axially space the same, and having other portions thereof formed to engage inner circumferential edges of the rail rings to radially expand the same and insure good sealing contact between the outer circumferential edges of the rail rings and the cylinder, said other portions of said expander-spacer ring being substantially continuous and bent at an acute angle to the axis of the ring to extend relatively axially outwardly, respectively, of the ring, said first portions having circumferentially spaced legs with apertures in said other portions between said legs.

4. An expander-spacer ring to space and expand the sealing rings in an oil ring groove of a piston reciprocably disposed in a cylinder, comprising an elongated strip of resilient material having substantially continuous longitudinal edge portions and a plurality of transverse legs formed in said strip integral with said edge portions, said legs being bent upon themselves twice to form spaced radially outwardly extending portions adapted to engage the sealing rings apertures in said strip between said legs respectively, said strip being bent upon itself to assume an H-shaped configuration in cross section and formed into a ring with said edge portions disposed at the radially inner side thereof.

5. An expander-spacer ring to space and expand the sealing rings in an oil ring groove of a piston reciprocably disposed in a cylinder, comprising an elongated strip of resilient material having substantially continuous longitudinal edge portions and a plurality of transverse legs formed in said strip integral with said edge portions, said legs being bent upon themselves twice to form spaced radially outwardly extending portions adapted to engage the sealing rings apertures in said strip between said legs respectively, said strip being bent upon itself to assume an H-shaped configuration and formed into a ring with said edge portions disposed at the radially inner side thereof and bent respectively outwardly axially of the ring.

6. An expander-spacer ring to space and expand the sealing rings in an oil ring groove of a piston reciprocably disposed in a cylinder, comprising an elongated strip of resilient material having substantially continuous longitudinal edge portions and a plurality of transversely extending elongated openings legs formed in said strip between said openings, said strip having an H-shaped configuration and formed into a ring with said edge portions disposed at the radially inner side thereof and bent respectively outwardly axially of the ring at acute angles to the axis of the ring, said legs being bent upon themselves twice to form radially outwardly extending portions adapted to engage the sealing rings.

References Cited in the file of this patent

UNITED STATES PATENTS

| | | |
|---|---|---|
| 2,273,691 | Bowers | Feb. 17, 1942 |
| 2,695,825 | Estey | Nov. 30, 1954 |